US006171430B1

(12) United States Patent
Nassi et al.

(10) Patent No.: US 6,171,430 B1
(45) Date of Patent: Jan. 9, 2001

(54) METHOD AND DEVICE FOR OFFSET VARNISHING

(75) Inventors: Aldo Nassi; Egidio A. Forner; Roberto Marangoni, all of Florence (IT)

(73) Assignees: Moroel di Marangoni Roberto & C. Sa.S.; Syrom 90 S.p.A., both of (IT)

( * ) Notice: Under 35 U.S.C. 154(b), the term of this patent shall be extended for 0 days.

(21) Appl. No.: 09/074,614

(22) Filed: May 7, 1998

Related U.S. Application Data

(63) Continuation of application No. 07/926,684, filed on Aug. 6, 1992, now abandoned.

(30) Foreign Application Priority Data

Aug. 8, 1991 (IT) ............................................... FI91A0202

(51) Int. Cl.[7] ............................... B32B 31/00; B05D 1/28

(52) U.S. Cl. .......................... 156/248; 156/254; 156/257; 156/267; 156/268; 156/344; 427/428

(58) Field of Search ..................................... 156/248, 254, 156/257, 268, 344, 247, 267, 256; 427/428

(56) References Cited

FOREIGN PATENT DOCUMENTS

| | | | |
|---|---|---|---|
| 2243832 | * | 5/1975 | (FR) . |
| 48-43285 | * | 12/1973 | (JP) . |
| 60-146088 | * | 8/1985 | (JP) . |
| 1-262135 | * | 10/1989 | (JP) . |

* cited by examiner

*Primary Examiner*—Linda L. Gray
(74) *Attorney, Agent, or Firm*—McGlew and Tuttle, P.C.

(57) ABSTRACT

The method of varnishing a printed medium is characterized in that: a laminated material 9 consisting of two connected layers is used for the production of the template F; the upper layer 11 of the material is cut along the pattern of the template which is to be formed, while the lower layer 13 is kept whole; the areas of the upper layer corresponding to the areas not to be varnished are detached from the lower layer; and the laminated material is applied to a press device 5 capable of interacting with an opposing cylinder 7, the upper layer of the laminated material collecting the varnish from a distribution device 1,3 and applying the varnish to the medium to be varnished.

30 Claims, 2 Drawing Sheets

METHOD AND DEVICE FOR OFFSET VARNISHING

This is a continuation of application Ser. No. 07/926,684 filed Aug. 6, 1992 and now abandoned.

FIELD OF THE INVENTION

The invention relates to a method for offset varnishing, which is particularly suitable for use in the manufacture of paper and cardboard articles, and to a product for the application of the method and to a printing machine equipped to carry out the method.

BACKGROUND OF THE INVENTION

In the printing industry, in the manufacture of paper and cardboard articles, and in similar areas of application, it is frequently necessary to provide protective varnishing of a printed medium such as cardboard or the like. The varnishing constitutes the final stage of the printing process and consists in the application of a layer of protective varnish which covers the whole surface of the printed and varnished material on or off the production line.

At the present time, indirect varnishing is carried out in the following way: a template which may be made of various types of material, such as linoleum or equivalent material, suitably coated with adhesive, is affixed to a plate designed to be applied to a rotating cylinder. The template reproduces the pattern of the areas of the medium to be varnished. For example, in the case of the production of cut-outs to form boxes, the template will have a perimeter corresponding to that of the cut-out product. The plate is then applied to the plate-cylinder. During the rotation of the plate-cylinder, the outer surface of the template is continuously in contact with the varnish. The collected varnish is transferred to the surface of a blanket cylinder. The blanket cylinder then transfers the varnish deposited on its surface directly to the medium to be processed, the transfer taking place with the aid of an opposing impression cylinder.

This method has numerous disadvantages. One of the disadvantages being that materials of the linoleum type are opaque, insufficiently soft, and consequently hard to cut.

In offset printing machines, production line printing and varnishing systems are used, with machines printing five or more colours and a coating stack with which the complete or reserved varnish is applied. For the varnishing of areas, materials of the rubber-coated fabric type (blankets) are normally used for direct varnishing. The coating is removed from the material in those areas where varnishing is not required. This system is complicated and expensive, particularly owing to the cost of the material and of the coat-removal operations. Furthermore, the rubber-coated material is opaque, and consequently the transfer of the varnish to the medium is not always optimal.

SUMMARY AND OBJECTS OF THE PRESENT INVENTION

The object of the invention is an offset varnishing method which is simpler and more economical than the conventional methods, while maintaining a high quality of the finished product.

A further object of the invention is a product which is particularly suitable for the application of this method.

A further object of the invention is a varnishing assembly to carry out the method according to the invention.

Basically, the method according to the invention is characterised in that a laminated material consisting of two connected layers is used for the production of the template. The upper layer of the material is cut along the pattern of the template which is to be formed, while the lower layer is kept whole. The portions of said upper layer which are not to be varnished are detached from the lower layer and the laminated material is applied to a press means capable of interacting with an opposing cylinder. The upper layer of the laminated material collecting the varnish from distribution means and applying the varnish to the medium to be varnished.

According to this method, therefore, a laminated material, from which the template to be applied to the cylinder of the varnishing assembly is formed, is used for direct varnishing, thus avoiding the operations of removing the coating of the blanket. The same product may also be applied in indirect varnishing systems. In this case, the laminated material replaces the metal plate to be applied to the plate-cylinder.

The operations for the formation of the template are greatly simplified. A further simplification is achieved by specifying the use of a transparent laminated material, which enables the upper layer of the material to be cut simply by laying the material by contact on a form reproducing the pattern of the template to be formed.

Advantageous characteristics of the laminated material according to the invention are stated in the attached claims.

The invention will be understood more clearly by examining the description and the attached drawing, which provides a practical and non-restrictive illustration of the invention. In the drawing:

DETAILED DESCRIPTION OF THE PREFERRED EMBODIMENT

Figure 1:
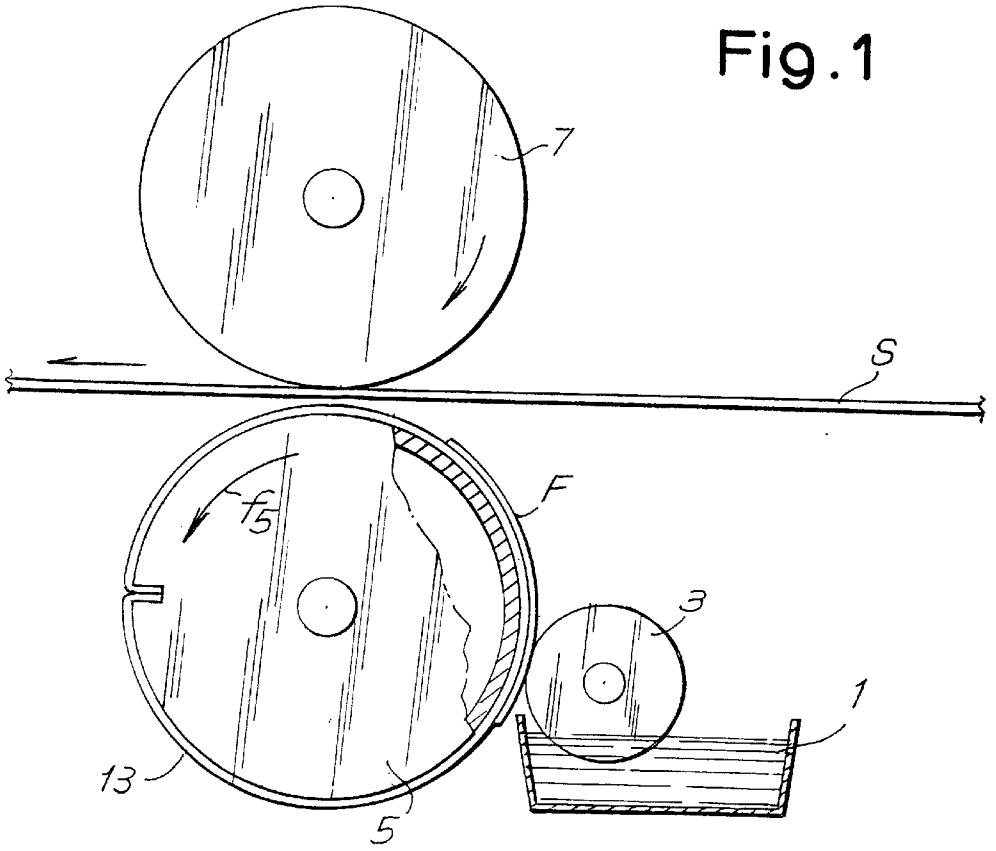
FIG. 1 is a highly schematic diagram of the cylinder to which the form is applied and of the opposing element.

FIG. 1 shows in a highly schematic way certain parts of a coating stack forming part of a production line with an offset printing machine, with the devices needed to varnish the medium. The medium having been freshly printed by the up-line printing assemblies. A vessel 1 contains the varnish which may be a varnish of the water-based, UV or other type with a suitable viscosity. A roller 3 distributes the varnish over a template F applied to a plate-cylinder 5 rotating in the direction f5. The cylinder 5 interacts with an opposing cylinder 7, which forms, in combination with the cylinder 5, a pair of press means for the printing of the medium S, for example cardboard or paper fed continuously from a roll, or other material.

Figure 2:
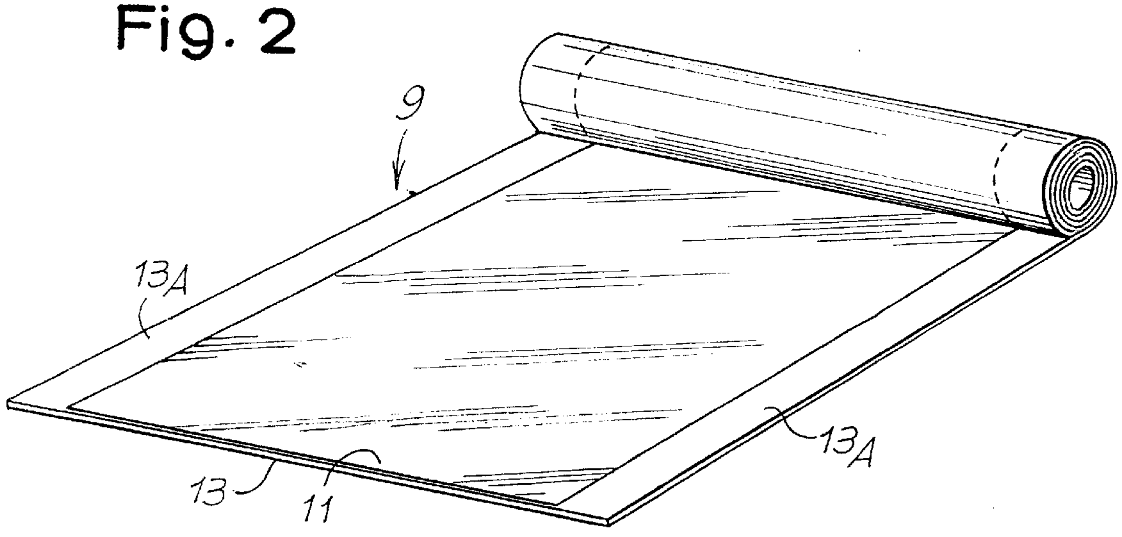
FIG. 2 shows a roll of the laminated material according to the invention.

Characteristically, according to the invention, a laminated material, shown schematically in FIG. 2, is used to form the template F. The laminated material, indicated by 9, consists of two layers 11 and 13 respectively, and is preferably produced in roll form. Production in roll form enables templates of any size to be formed, with the minimum of waste and discards.

Figure 4:
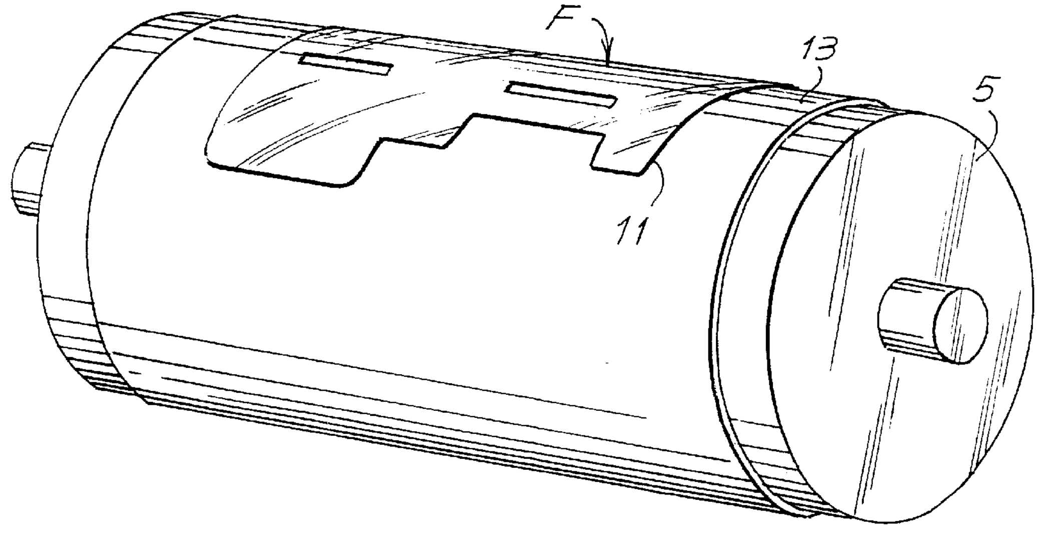
FIG. 4 shows in a highly schematic way the application of the laminated material to the press cylinder.

The lower layer, and/or layer of first layer of the laminated mater 9, indicated by 13, is advantageously slightly wider than the upper or second layer, indicated by 11. The edges 13A of the lower layer, which project beyond the upper layer, enable the portion of laminated material on which the template is formed to be easily directly attached or anchored to the cylinder 5 as shown in FIGS. 1 and 4.

Both the lower layer 13 and the upper layer 11 may advantageously be formed from transparent or translucent plastic material. In particular, a layer of polyester whose thickness may advantageously lie in the range from 250 to 350 micrometres may be used as the lower layer. The upper layer 11 is preferably formed from polypropylene and polyethylene with a thickness from 250 to 1000 micrometres. The upper layer 11 is suitably adhesive-coated to permit the permanent connection of the two layers 11 and 13.

Figure 3:
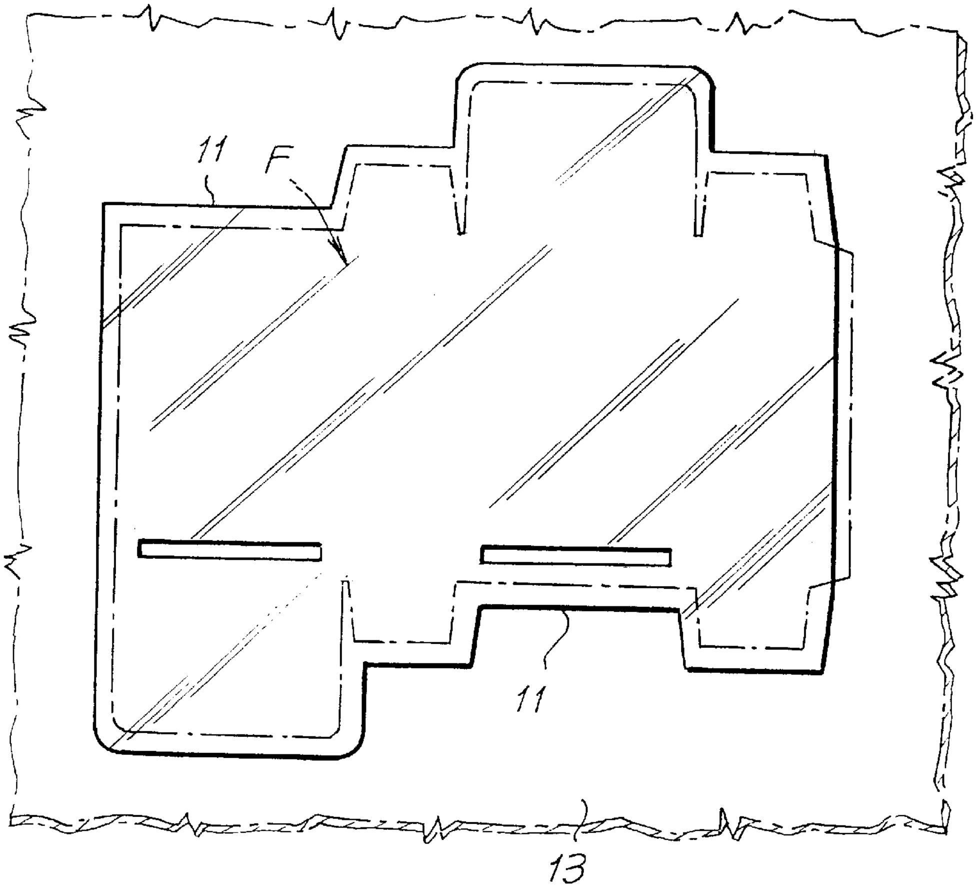
FIG. 3 shows a portion of laminated material in which the upper layer has been cut to produce a form.

The template F is formed by superimposing a piece of material 9 over an image, drawn on paper for example, of the pattern which the template F is to have. A calibrated blade is then used to cut the upper layer 11 of the laminated material 9 along the pattern which the template F is to have. The blade is calibrated in such a way that the depth of cut is such that it does not affect the lower layer 13, which has to remain whole. FIG. 3 illustrates an example of a template F produced by the cutting of the upper layer 11 and the detachment of the portions of the upper layer lying outside the perimeter of the template from the lower layer 13. The template F produced in this way is applied to the cylinder 5. When the template F has been mounted on the cylinder 5, as shown schematically in FIG. 4, the operation of varnishing the medium S may commence.

It is to be understood that the drawing shows only an illustration provided solely as a practical demonstration of the invention, this invention being able to vary its forms and dispositions without thereby departing from the scope of the guiding concept of the invention. Any reference numbers in the attached claims has the purpose of facilitating the reading of the claims with reference to the description and drawing, and does not limit the scope of protection represented by the claims.

What is claimed is:

1. Method of varnishing a printed medium, characterized in that:

a laminated material consisting of upper and lower connected layers is used for the production of a template (F), said laminated material being translucent;

the upper layer of said material is cut along the pattern of the template which is to be formed, while the lower layer is kept whole, said upper layer being cut while keeping the laminated material in contact with a medium on which a pattern which the template (F) is to have is reproduced;

areas of said upper layer corresponding to areas not to be varnished are detached from the lower layer; and said lower layer is directly applied to a press means capable of interacting with an opposing cylinder, the upper layer of said laminated material collecting varnish from distribution means and applying said varnish to the medium to be varnished.

2. A method of producing a template for varnishing a printed medium, the method comprising the steps of:

providing an image of a pattern;

placing on said image a laminated material consisting of a first and a second layer connected to each other by an adhesive which allows peeling off of the two layers, said first and second layers being partially transparent;

cutting said first layer along said pattern while keeping said second layer integral;

peeling off areas of said first layer from said second layer not corresponding to said pattern, arranging said laminated material around a printing cylinder, with said second layer being in contact with a cylindrical surface of said printing cylinder and the template formed in said first layer projecting radially from said lower layer;

anchoring said laminated material on said cylinder by means of the second layer;

arranging an opposing cylinder parallel to said printing cylinder;

rotating said printing cylinder and said opposing cylinder;

applying a varnish on the non-removed portions of the first layer;

moving the medium through a nip formed between said printing cylinder and said opposing cylinder;

transferring said varnish from said non-removed portions of the first layer to said medium.

3. Method according to claim 2, wherein said first layer is a layer of polypropylene and polyethylene and said second layer is of polyester.

4. Method according to claim 2, wherein said first layer is a layer of polypropylene and polyethylene.

5. Method according to claim 2, wherein said second layer is of polyester.

6. A method in accordance with claim 2, wherein:

said second layer has an edge projecting beyond said first layer;

said anchoring including directly attaching said edge of said second layer to said printing cylinder.

7. A method for varnishing a printed medium including the steps of:

providing an image of a pattern;

placing on said image a laminated material consisting of a first and a second layer connected to each other, said two connected layers translucent;

cutting said first layer along said pattern while keeping said second layer integral;

peeling off from said second layer areas of said first layer corresponding to areas not to be varnished;

anchoring said laminated material directly around a printing cylinder;

arranging an opposing cylinder parallel to said printing cylinder;

rotating said printing cylinder and said opposing cylinder;

moving said printed medium through a nip formed between said printing cylinder and said opposing cylinder.

8. Method according to claim 7, wherein said first layer is a layer of polypropylene and polyethylene and said second layer is of polyester.

9. Method according to claim 7, wherein said first layer is a layer of polypropylene and polyethylene.

10. Method according to claim 7, wherein said second layer is of polyester.

11. Method according to claim 7, wherein said first and second layers are connected by adhesive.

12. Method according to claim 7, wherein said first layer is a layer of polypropylene and polyethylene having a thickness between 250–1,000 micrometers, said second layer is of polyester having a thickness between 250–350 micrometers, and wherein said two layers are connected by adhesive.

13. A method in accordance with claim 7, wherein:

said second layer has an edge projecting beyond said first layer;

said anchoring including directly attaching said edge of said second layer to said printing cylinder.

14. A method for varnishing a printed medium including the steps of:

providing an image of a pattern;

placing on said image a laminated material consisting of an upper and a lower layer connected to each other, said upper and lower layers being partially transparent;

cutting said upper layer along said pattern while keeping said lower layer integral;

peeling off from said lower layer areas of said upper layer corresponding to areas not to be varnished;

anchoring said laminated material directly around a printing cylinder;

rotating said printing cylinder;

contacting said upper layer on said rotating cylinder with said printed medium.

15. Method according to claim 14, wherein said upper layer is a layer of polypropylene and polyethylene and said lower layer is of polyester.

16. Method according to claim 14, wherein said upper layer is a layer of polypropylene and polyethylene.

17. Method according to claim 14, wherein said lower layer is of polyester.

18. Method according to claim 14, wherein said upper and lower layers are connected by adhesive.

19. Method according to claim 14, wherein said upper layer is a layer of polypropylene and polyethylene having a thickness between 250–1,000 micrometers, said lower layer is of polyester having a thickness between 250–350 micrometers, and wherein said two layers are connected by adhesive.

20. A method in accordance with claim 14, wherein:

said lower layer has an edge projecting beyond said upper layer;

said anchoring including directly attaching said edge of said lower layer to said printing cylinder.

21. A method for varnishing a printed medium including the steps of:

providing an image of a pattern;

placing on said image a laminated material consisting of a first and a second layer connected to each other, said first and second layers being translucent;

cutting said first layer along said pattern while keeping said second layer integral;

peeling off from said second layer areas of said first layer corresponding to areas not to be varnished;

anchoring said laminated material directly around a printing cylinder;

rotating said printing cylinder;

wetting said first layer with a varnish;

contacting the first layer on said rotating cylinder with the printed medium, thus varnishing said printed medium.

22. Method according to claim 21, wherein said first layer is a layer of polypropylene and polyethylene and said second layer is of polyester.

23. Method according to claim 21, wherein said first layer is a layer of polypropylene and polyethylene.

24. Method according to claim 21, wherein said second layer is of polyester.

25. Method according to claim 21, wherein said first and second layers are connected by adhesive.

26. Method according to claim 21, wherein said first layer is a layer of polypropylene and polyethylene having a thickness between 250–1,000 micrometers, said second layer is of polyester having a thickness between 250–350 micrometers, and wherein said two layers are connected by adhesive.

27. A method in accordance with claim 21; wherein:

said second layer has an edge projecting beyond said first layer;

said anchoring including directly attaching said edge of said second layer to said printing cylinder.

28. A method in accordance with claim 26, wherein:

said second layer has an edge projecting beyond said first layer;

said anchoring including directly attaching said edge of said second layer to said printing cylinder.

29. A method for varnishing an article in an offset printing machine, the method comprising the steps of:

providing an image of a pattern to be varnished;

providing a laminated material including first and second layers connected to each other, said first and second layers being partially transparent;

projecting said image through said laminated material from said second layer to said first layer;

cutting said first layer along an edge of said image projected through said laminated material;

removing areas of said first layer from said second layer, said areas not corresponding to said pattern;

anchoring said laminated material directly onto a printing cylinder in the offset printing machine;

applying varnish to said first layer.

30. A method in accordance with claim 29, wherein:

said first layer is composed of one of polypropylene and polyethylene;

said second layer is formed of polyester.

* * * * *